United States Patent
Chae

(10) Patent No.: US 11,349,610 B2
(45) Date of Patent: May 31, 2022

(54) METHOD AND APPARATUS FOR TRANSMITTING RECEIPT ACKNOWLEDGEMENT IN WIRELESS COMMUNICATION SYSTEM

(71) Applicant: LG Electronics Inc., Seoul (KR)

(72) Inventor: Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 16/870,298

(22) Filed: May 8, 2020

(65) Prior Publication Data

US 2020/0313801 A1 Oct. 1, 2020

Related U.S. Application Data

(63) Continuation of application No. 16/077,880, filed as application No. PCT/KR2017/001595 on Feb. 14, 2017, now Pat. No. 10,680,760.

(Continued)

(51) Int. Cl.
*H04L 1/16* (2006.01)
*H04W 28/04* (2009.01)
(Continued)

(52) U.S. Cl.
CPC .............. *H04L 1/1671* (2013.01); *H04L 1/08* (2013.01); *H04L 1/1854* (2013.01);
(Continued)

(58) Field of Classification Search
CPC ....... H04L 1/1671; H04L 1/08; H04L 1/1854; H04L 5/0055; H04L 2001/0097;
(Continued)

(56) References Cited

U.S. PATENT DOCUMENTS

2016/0135143 A1 5/2016 Won et al.
2016/0353450 A1* 12/2016 Miao ................. H04W 92/20
2018/0206176 A1* 7/2018 Panteleev ............ H04W 76/14

FOREIGN PATENT DOCUMENTS

WO WO2015/065281 5/2015
WO WO2016/018068 2/2016
(Continued)

OTHER PUBLICATIONS

Alcatel-Lucent Shanghai Bell, Alcatel-Lucent, "L3-based UE-to-network relays," R1-152668, 3GPP TSG RAN WG1 Meeting #81, Fukuoka, Japan, May 25-29, 2015, 4 pages, XP050972669.

(Continued)

*Primary Examiner* — Kibrom T Hailu
(74) *Attorney, Agent, or Firm* — Fish & Richardson P.C.

(57) ABSTRACT

One embodiment of the present invention relates to a method for a second user equipment transmitting a receipt acknowledgement in a wireless communication system, the method for transmitting the receipt acknowledgement comprising the steps of: the second UE receiving data from the first UE; determining a subframe to transmit the receipt acknowledgement by comparing a time resource pattern for transmission (T-RPT) of the first UE and a T-RPT of the second UE; and transmitting the receipt acknowledgement relating to the data from the determined subframe to the first UE.

12 Claims, 16 Drawing Sheets

Related U.S. Application Data

(60) Provisional application No. 62/295,141, filed on Feb. 14, 2016.

(51) Int. Cl.
| | | |
|---|---|---|
| *H04W 72/02* | (2009.01) | |
| *H04L 1/18* | (2006.01) | |
| *H04L 1/08* | (2006.01) | |
| *H04L 5/00* | (2006.01) | |
| *H04W 72/04* | (2009.01) | |
| *H04L 1/00* | (2006.01) | |
| *H04W 4/70* | (2018.01) | |

(52) U.S. Cl.
CPC .......... *H04L 5/0055* (2013.01); *H04W 28/04* (2013.01); *H04W 72/02* (2013.01); *H04W 72/0446* (2013.01); *H04L 2001/0097* (2013.01); *H04W 4/70* (2018.02)

(58) Field of Classification Search
CPC ...... H04L 51/30; H04W 28/04; H04W 72/02; H04W 72/0446; H04W 4/70; H04W 52/04

See application file for complete search history.

(56) References Cited

FOREIGN PATENT DOCUMENTS

| WO | WO2016/021921 | 2/2016 |
|---|---|---|
| WO | WO2016/021967 | 2/2016 |
| WO | WO2015/156604 | 10/2016 |

OTHER PUBLICATIONS

International Search Report in International Application No. PCT/KR2017/001595, dated Jun. 1, 2017, 15 pages.

LG Electronics, "Communication enhancements for UE-to-Network relay operation," R1-152724, 3GPP TSG RAN WG1 Meeting #81, Fukuoka, Japan, May 25-29, 2015, 6 pages, XP050973886.

Partial European Search Report in European Application No. 17750494.1, dated Aug. 20, 2019, 20 pages.

Qualcomm, "Motivation for WI on D21 D based MTC," RP-151946, 3 GPP TSG RAN Meeting #70, Sitges, Spain, Dec. 7-10, 2015, 7 pages, XP051655509.

\* cited by examiner

FIG. 10

| SF index | n | n+1 | n+2 | n+3 | n+4 | n+5 | n+6 | n+7 | | | | | | | |
|---|---|---|---|---|---|---|---|---|---|---|---|---|---|---|---|
| UE1 TRP | 1 | 0 | 1 | 0 | 0 | 1 | 1 | 0 | 1 | 0 | 1 | 0 | 0 | 1 | 0 |

A/N is transmitted in first Tx subframe appearing after n+4 and the Tx subframe not overlapped with UE1

| UE2 TRP | 0 | 1 | 0 | 1 | 0 | 0 | 1 | 1 | 0 | 1 | 0 | 1 | 0 | 0 | 1 | 1 |

FIG. 11

| SF index | n | n+1 | n+2 | n+3 | n+4 | n+5 | n+6 | n+7 | | | | | | | |
|---|---|---|---|---|---|---|---|---|---|---|---|---|---|---|---|
| UE1 TRP | 1 | 0 | 1 | 0 | 0 | 1 | 1 | 0 | 1 | 0 | 1 | 0 | 0 | 1 | 0 |

A/N is repeatedly transmitted a times in first Tx subframe appearing after n+4

| UE2 TRP | 0 | 1 | 0 | 1 | 0 | 0 | 1 | 1 | 0 | 1 | 0 | 1 | 0 | 0 | 1 | 1 | ial
METHOD AND APPARATUS FOR TRANSMITTING RECEIPT ACKNOWLEDGEMENT IN WIRELESS COMMUNICATION SYSTEM

CROSS-REFERENCE TO RELATED APPLICATIONS

This application is a continuation of U.S. application Ser. No. 16/077,880, filed on Aug. 14, 2018, now allowed, which is a National Stage application under 35 U.S.C. § 371 of International Application No. PCT/KR2017/001595, filed on Feb. 14, 2017, which claims the benefit of U.S. Application No. 62/295,141, filed on Feb. 14, 2016. The disclosures of the prior applications are incorporated by reference in their entirety.

TECHNICAL FIELD

Following description relates to a wireless communication system, and more particularly, to a method of transmitting ACKnowledgment/Negative ACKnowledgment (ACK/NACK) and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

Currently, discussion on V2X communication associated with D2D communication is in progress. The V2X communication corresponds to a concept including V2V communication performed between vehicle UEs, V2P communication performed between a vehicle and a UE of a different type, and V2I communication performed between a vehicle and an RSU (roadside unit).

SUMMARY

A technical task of the present invention is to provide a method for a user equipment to transmit ACK/NACK in D2D, V2X communication and the like.

Technical tasks obtainable from the present invention are non-limited by the abovementioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a method of transmitting ACK/NACK (ACKnowledgment/Negative ACKnowledgment), which is transmitted by a second UE (User Equipment) in a wireless communication system, includes the steps of receiving data, by the second UE, from a first UE, determining a subframe in which ACK/NACK is to be transmitted by comparing T-RPT (Time Resource Pattern for Transmission) of the first UE with T-RPT of the second UE, and transmitting ACK/NACK to the first UE in the determined subframe in response to the data.

To further achieve these and other advantages and in accordance with the purpose of the present invention, according to a different embodiment, a second UE (User Equipment) transmitting ACK/NACK (ACKnowledgment/Negative ACKnowledgment) in a wireless communication system includes a transmitter and a receiver, and a processor, the processor configured to control the receiver to receive data from a first UE, the processor configured to determine a subframe in which ACK/NACK is to be transmitted by comparing T-RPT (Time Resource Pattern for Transmission) of the first UE with T-RPT of the second UE, the processor configured to control the transmitter to transmit ACK/NACK to the first UE in the determined subframe in response to the data.

The comparison between the T-RPT of the first UE and the T-RPT of the second UE can be performed on subframes appearing after a $k^{th}$ subframe from a subframe in which the data is received.

The second UE can determine a first subframe of which a T-RPT value of the first UE corresponds to 0 and a T-RPT value of the second UE corresponds to 1 as the subframe in which the ACK/NACK is to be transmitted among the subframes appearing after the $k^{th}$ subframe.

The second UE can repeatedly transmit the ACK/NACK in a number of subframes of which the T-RPT value of the second UE corresponds to 1 appearing after the first subframe.

The second UE can repeatedly transmit the ACK/NACK in a number of subframes of which the T-RPT value of the first UE corresponds to 0 and the T-RPT value of the second UE corresponds to 1 appearing after the first subframe.

ACK/NACK can be transmitted together in the a number of subframes in response to data other than the data.

The T-RPT of the first UE and the T-RPT of the second UE can be determined by the first UE and the second UE, respectively.

The T-RPT of the second UE may correspond to T-RPT circularly shifted from the T-RPT of the first UE as much as a predetermined value.

The first UE corresponds to a relay UE and the second UE may correspond to an MTC (Machine Type Communication) UE.

The number of 1s included in the T-RPT of the second UE can be included in a predetermined range.

The subframe in which the ACK/NACK is to be transmitted can include most recently received control information prior to the subframe or channel state information on data.

The k may correspond to 4.

According to the present invention, when ACK/NACK is transmitted in communication rather than cellular communication, it is able to solve a problem due to a half-duplex constraint.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 10 to 15B are diagrams illustrating transmission timing of ACK/NACK according to each embodiment of the present invention;

DETAILED DESCRIPTION

Figure 1A:
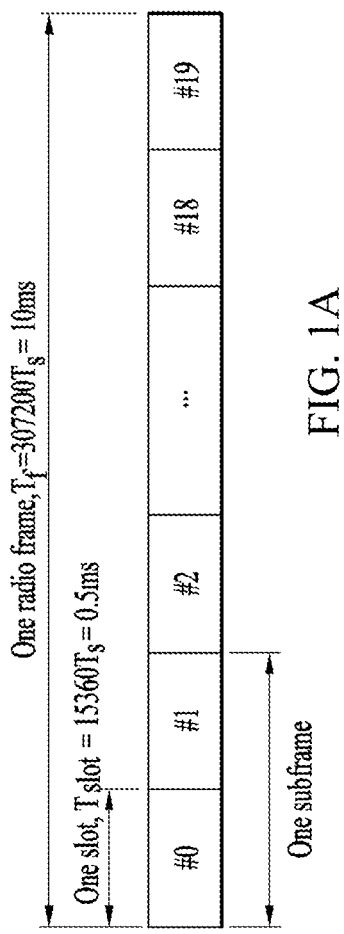
FIGS. 1A and 1B are diagrams for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Figure 1B:
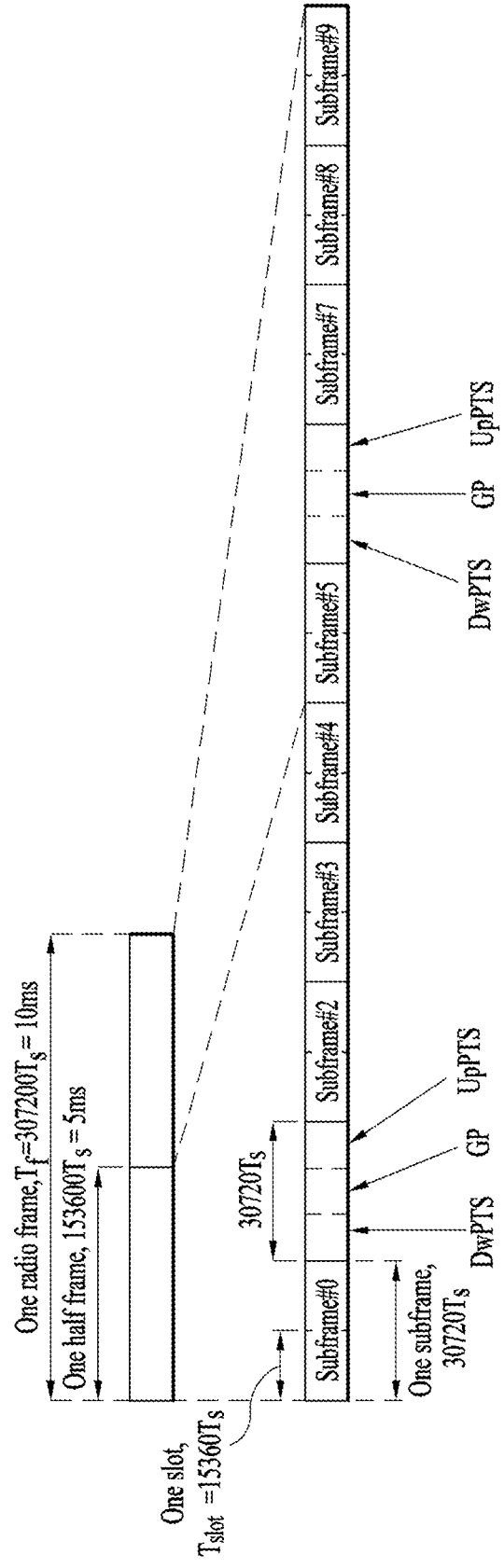

With reference to FIGS. 1A and 1B, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1A illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1B illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
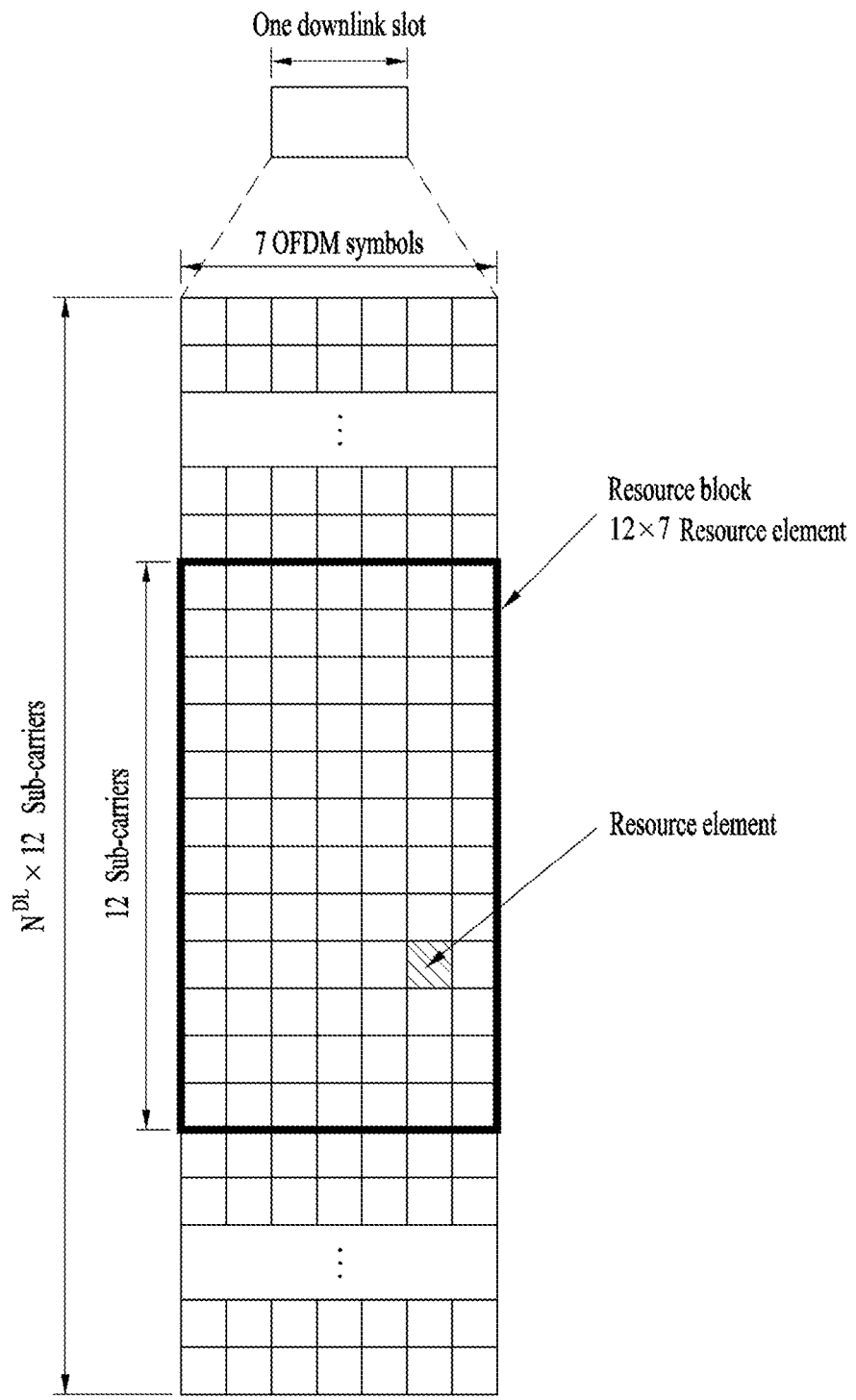
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
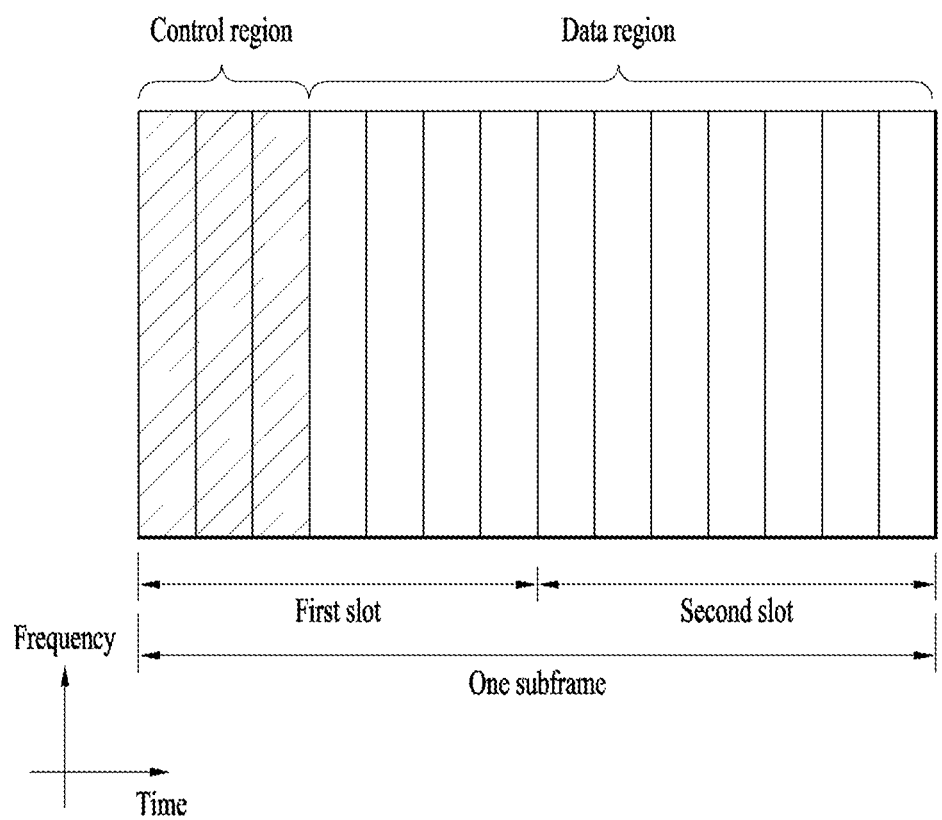
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
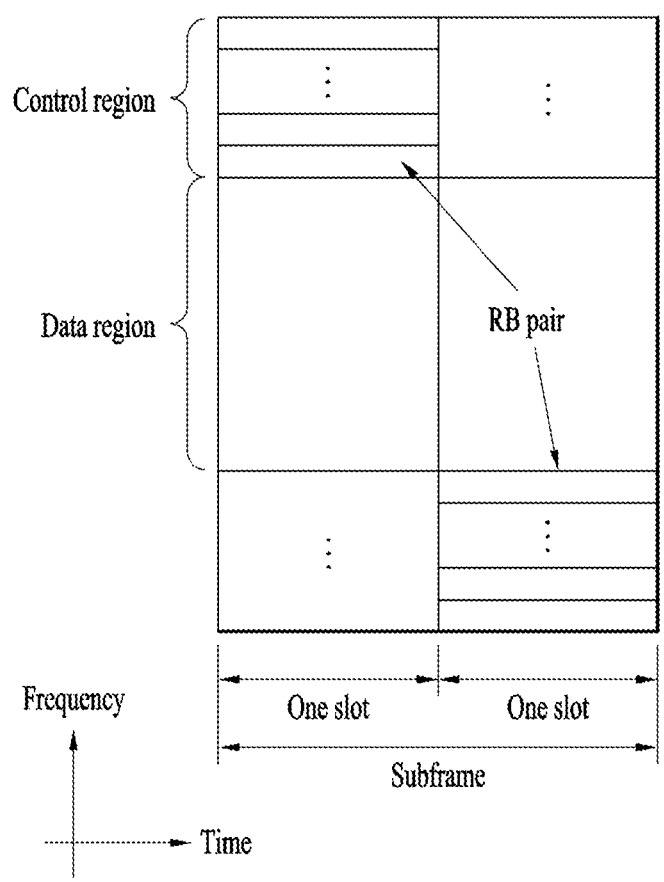
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MB SFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5A:
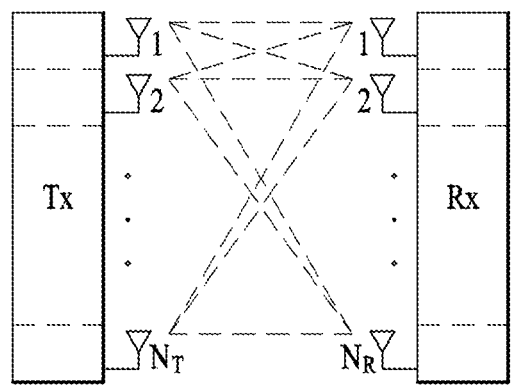
FIGS. 5A and 5B are diagrams for a configuration of a wireless communication system having multiple antennas.
Figure 5B:
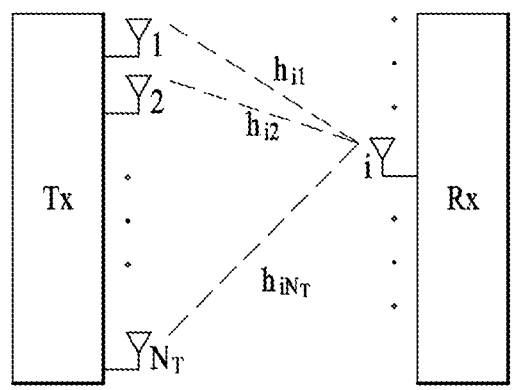

FIGS. 5A and 5B are diagrams illustrating a configuration of a wireless communication system having multiple antennas.

As shown in FIG. 5A, if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{Equation 1}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{Equation 2}$$

Meanwhile, transmit powers can be set different from each other for individual pieces of transmission information $s_1, s_2, \ldots, s_{N_T}$, respectively. If the transmit powers are set to $P_1, P_2, \ldots P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Equation 5

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T$$

Equation 6

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5B is a diagram illustrating channels from the NT transmit antennas to the receive antenna i. The channels may be combined and expressed in the form of a vector and a matrix. In FIG. 5B, the channels from the NT transmit antennas to the receive antenna i can be expressed as follows.

$$h_i^T = [h_{i1}, h_{i2}, \ldots, h_{iN_T}]$$

Equation 7

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{2N_T} \\ h_{21} & h_{22} & \cdots & h_{2N_T} \\ \vdots & & \ddots & \ddots \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$

Equation 8

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T$$

Equation 9

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Equation 10

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$

Equation 11

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
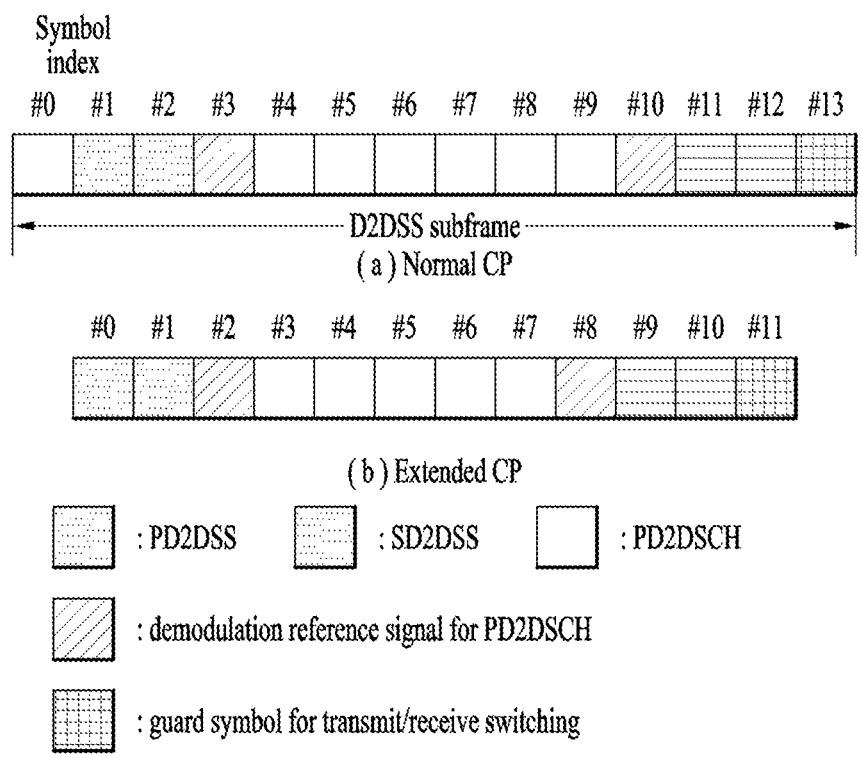
FIG. 6 illustrates a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
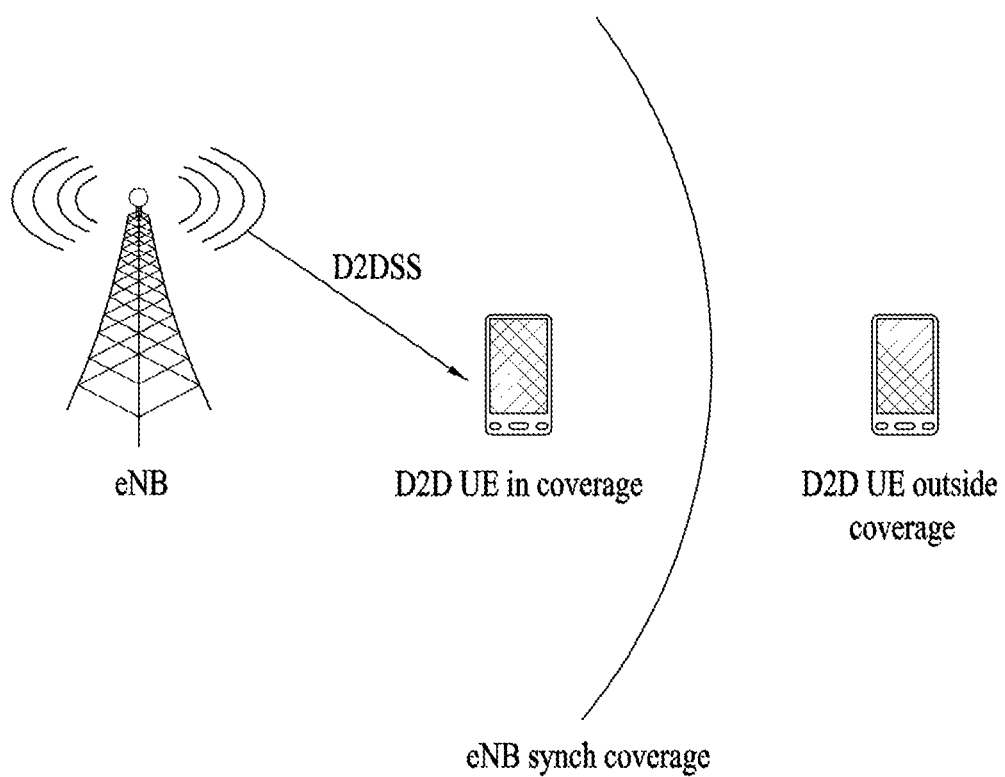
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8A:
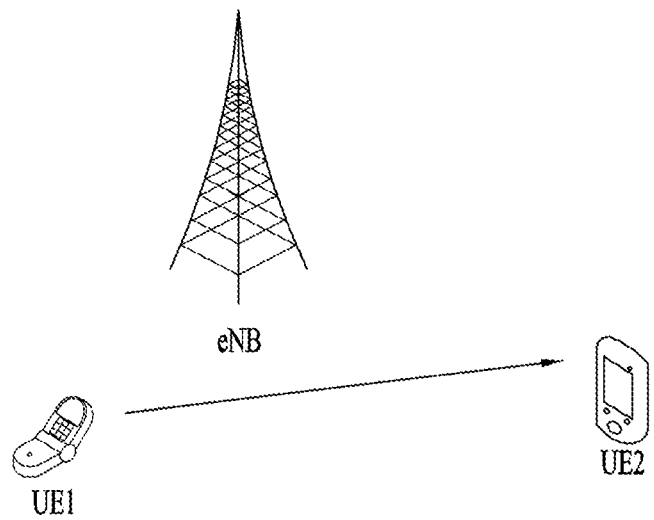
FIGS. 8A and 8B are diagrams for an example of a D2D resource pool for D2D communication.
Figure 8B:
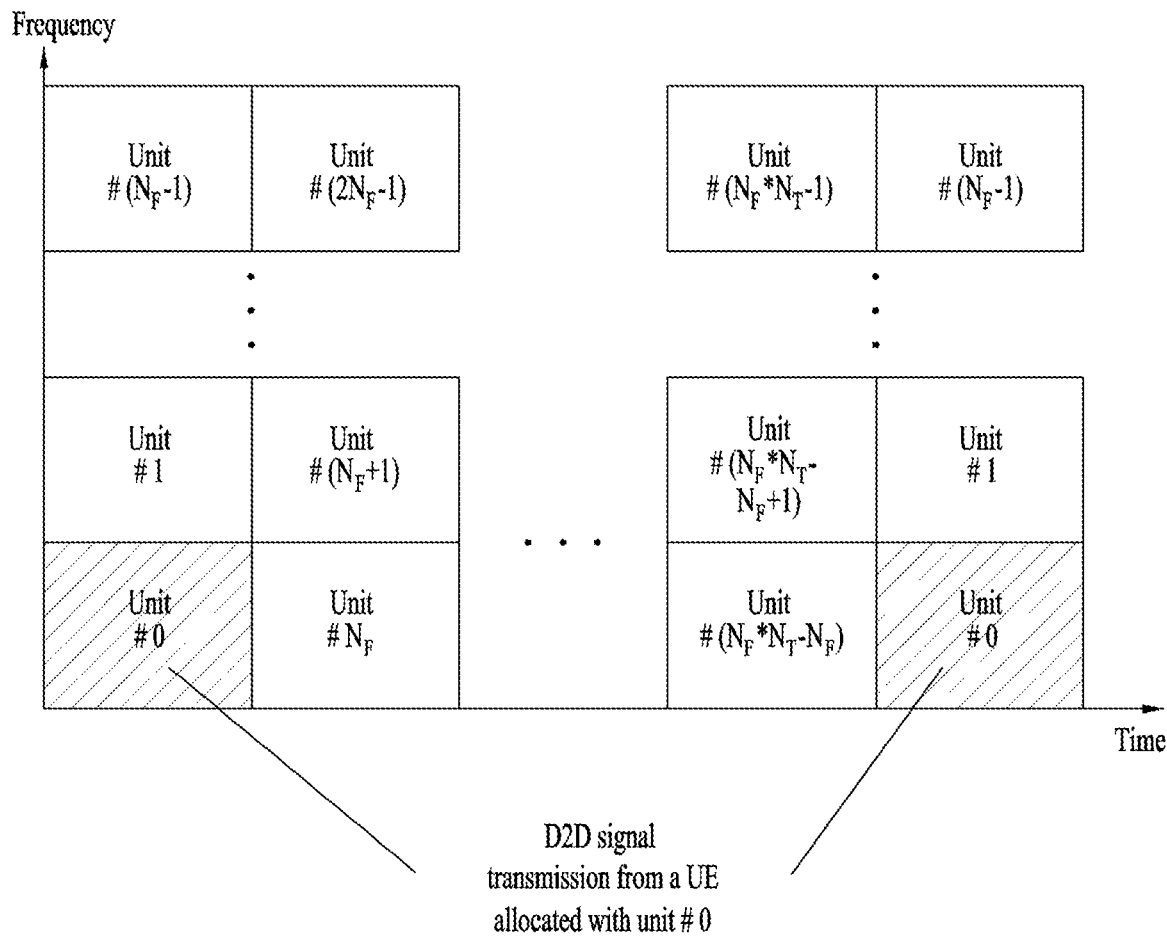

FIGS. 8A and 8B show an example of a UE1, a UE2 and a resource pool used by the UE1 and the UE2 performing D2D communication. In FIG. 8A, a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8B shows an example of configuring a resource unit. Referring to FIG. 8B, the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIGS. 8A and 8B, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
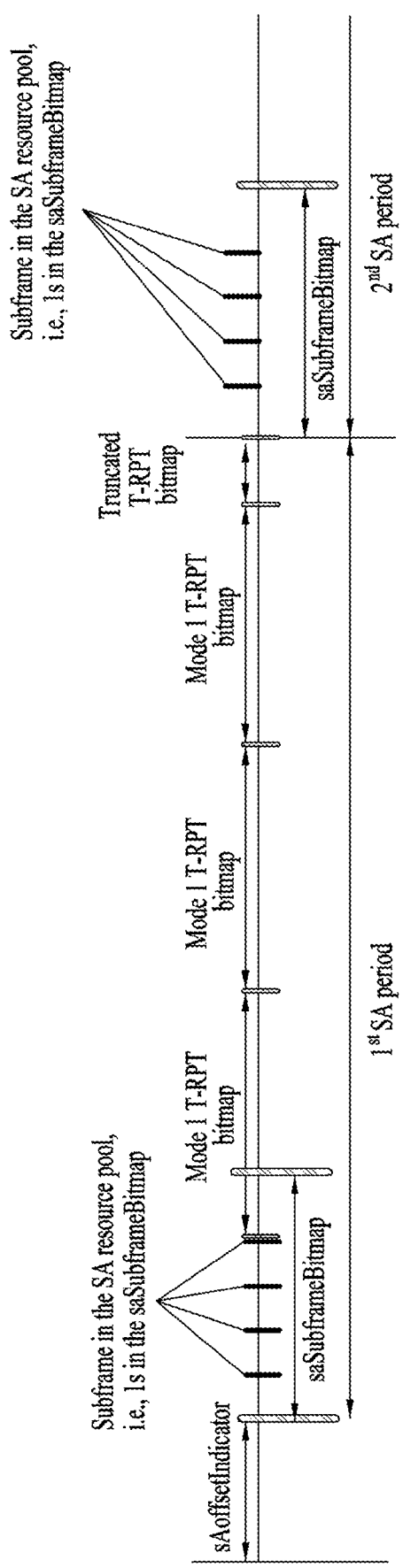
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission UE performs transmission at a position where a T-RPT bitmap corresponds to 1 in an indicated T-RPT and 4 transmissions are performed in a MAC PDU.

Meanwhile, in V2V (vehicle-to-vehicle) communication, a CAM (Cooperative Awareness Message) of a periodic message type, a DENM (Decentralized Environmental Notification Message) of an event triggered message type and the like can be transmitted. The CAM contains the basic vehicle information, including vehicle dynamic status information like direction and speed, vehicle static data like dimension, status of exterior lights, path history. The size of CAM message is between 50-300 Bytes. The DENM may correspond to a message which is generated when such an unexpected situation as a malfunction of a car, an accident, and the like occurs. The size of DENM is smaller than 3000 Bytes. All cars within the transmission range can receive the message. In this case, the DENM may have a priority higher than a priority of the CAM. In this case, when a message has a higher priority, it means that the message of the higher priority is preferentially transmitted in the aspect of a UE when messages are transmitted at the same time. Or, it means that the message of the higher priority is preferentially transmitted in time among a plurality of messages. In the aspect of a plurality of UEs, it may be able to make the message of the higher priority receive less interference compared to a message of a lower priority to reduce a reception error probability. If security overhead is included in the CAM, the CAM may have a bigger message size.

In the following, a method of transmitting HARQ (Hybrid automatic repeat request) ACK (acknowledgement)/NACK (Negative acknowledgement) (or ACK/NACK), a method of configuring transmit power between UEs and the like capable of being applied to D2D communication, V2X communication, and communication between MTC UEs or between an MTC UE and a relay UE are explained.

Method of Transmitting ACK/NACK

First Method of Determining Timing at which ACK/NACK is Transmitted

According to one embodiment of the present invention, a second UE can determine a subframe in which ACK/NACK is to be transmitted by receiving data from a first UE and comparing a T-RPT of the first UE with a T-RPT of the second UE. When the second UE compares the T-RPT of the first UE with the T-RPT of the second UE, the second UE can perform the comparison on subframes appearing after a $k^{th}$ subframe from a subframe in which data is received. The second UE can determine a first subframe of which the T-RPT of the first UE corresponds to 0 and the T-PRT of the second UE corresponds to 1 as a subframe in which ACK/NACK is to be transmitted among the subframes appearing after the $k^{th}$ subframe. The k can be configured by a number such as 4 in advance or can be forwarded to a UE via higher layer/physical layer signaling (this can be identically applied to the following description). The second UE can transmit ACK/NACK to the first UE in the determined subframe in response to the received data.

In particular, as shown in FIG. 10, when a data is received in a subframe #n, ACK/NACK transmission can be performed in a first Tx subframe appearing after a subframe #(n+4) and the Tx subframe not overlapped with Tx of a UE1 (transmission UE).

When a subframe in which ACK/NACK is to be transmitted is not determined by comparing T-RPT of a transmission UE with T-RPT of a reception UE, ACK/NACK can be transmitted in a subframe #(n+4) appearing after a subframe in which data is received similar to communication with an eNB. In this case, if a T-RPT value of a data transmission UE corresponds to 1 (i.e., if the data transmission UE performs transmission), the data transmission UE is unable to receive ACK/NACK. In particular, it is able to solve half-duplex constraint related to ACK/NACK transmission with the help of the configuration above.

In the foregoing description, although it is assumed that ACK/NACK is transmitted one time, ACK/NACK can be repeatedly transmitted a times. In particular, the second UE can repeatedly transmit ACK/NACK in the a number of subframes where a T-RPT value of the second UE corresponds to 1 after the first subframe. This method does not consider a T-RPT of the first UE in retransmission. Since ACK/NACK has already been transmitted in consideration of a transmission of the first UE, retransmission puts emphasis on fast transmission. Or, the second UE can repeatedly transmit ACK/NACK in the a number of subframes where a T-RPT value of the first UE corresponds to 0 and a T-RPT value of the second UE corresponds to 1 appearing after the first subframe. In particular, ACK/NACK is transmitted in consideration of the T-RPT of the first UE in retransmission. In particular, reception success of ACK/NACK is important in the present method. The retransmission/repetitive transmission of ACK/NACK can also be used for other embodiments described in the following. (For example, as shown in FIG. 11, when ACK/NACK is transmitted in a first Tx subframe appearing after a subframe #(n+4), repetitive transmission can be repeated 3 times in a subframe where a T-RPT value corresponds to 1.) A method to be used among the abovementioned two retransmission methods can be configured in advance or can be forwarded via higher layer/physical layer signaling.

Meanwhile, T-RPT of the first UE and T-RPT of the second UE can be determined by the first UE and the second UE, respectively. In this case, if the first UE and the second UE randomly select a T-RPT, huge numbers of cases may occur. In this case, since it is difficult for a UE to anticipate the maximum number of ACK/NACK to be transmitted in a specific subframe, it is difficult for the UE to determine the number of REs to be reserved when piggyback is performed on ACK/NACK. In order to prevent this, the second UE may use a T-RPT selected by the first UE and the T-RPT on which (circular) time shift is performed only. In particular, a T-RPT of the second UE may correspond to a T-RPT that circular shift as much as a predetermined value is performed on the T-RPT of the first UE. Or, it may be able to define a rule that the second UE uses a TRP of a specific pattern (e.g., a space of is is constant, the number of is is equal to or greater (less) than a prescribed number) only. For example, the number of is included in the T-RPT of the second UE can be included in a predetermined range. The abovementioned T-RPT selection can also be applied to other embodiments described in the following.

Second Method of Determining Timing at which ACK/NACK is Transmitted

Figure 12:
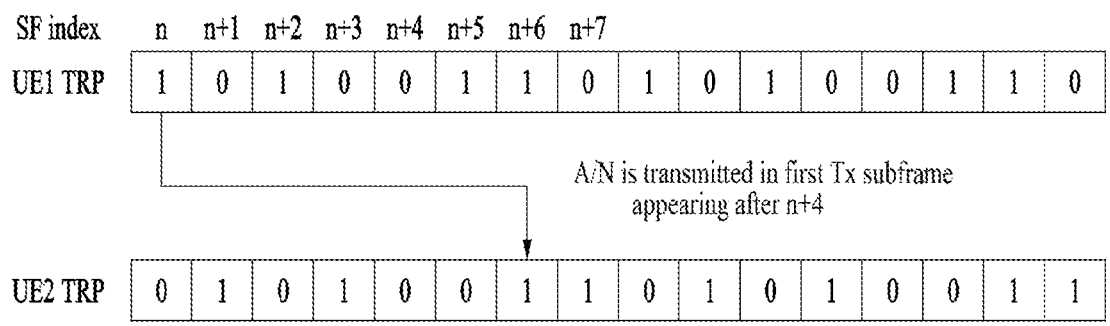

The second UE can transmit ACK/NACK in a first subframe where a T-RPT value corresponds to 1 appearing after n+k from a subframe in which data is received. In particular, as shown in FIG. 12, when a data is received in a subframe #n, ACK/NACK can be transmitted in a first Tx subframe (subframe #(n+6)) appearing after n+4 from the subframe #n.

Third Method of Determining Timing at which ACK/NACK is Transmitted

Figure 13:
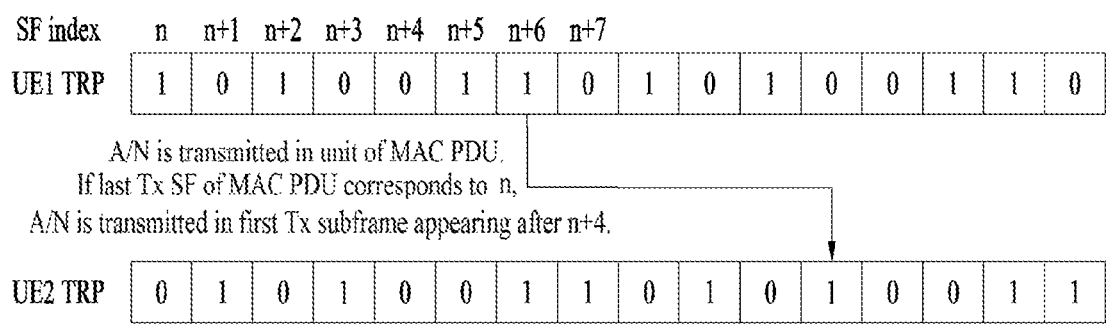

The second UE can perform ACK/NACK transmission in a unit of MAC PDU. Specifically, as shown in FIG. 13, if the last Tx subframe of MAC PDU corresponds to a subframe #n, ACK/NACK can be transmitted in a first Tx subframe appearing after a subframe #(n+4). Moreover, as mentioned earlier in the first method of determining ACK/NACK transmission timing, when a subframe in which transmission is performed by the first UE is determined by comparing T-RPT of the first UE with T-RPT of the second UE, ACK/NACK can be transmitted in a subframe not overlapped with the subframe.

Fourth Method of Determining Timing at which ACK/NACK is Transmitted

Figure 14:
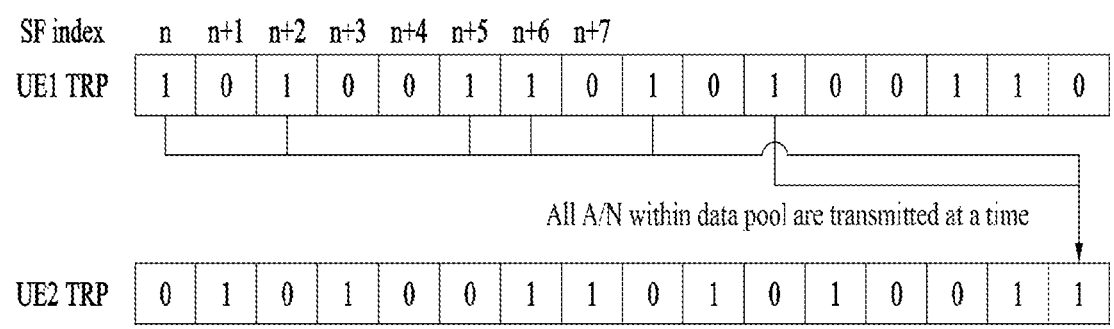

ACK/NACK can be transmitted at a time in response to all data received within a corresponding SC (sidelink control)/SA period in the last Tx subframe of the second UE. In particular, as shown in FIG. 14, the second UE can transmit ACK/NACK at a time in response to all data received within SC period/SA period in the last Tx subframe within the SC period/SA period. In this case, Tx overlap with the first UE may occur. Hence, ACK/NACK can be transmitted in the last Tx subframe not overlapped with the first UE. In this case, all ACK/NACK can be transmitted in a manner of being bundled, the ACK/NACK are transmitted in a manner of being bundled in a MAC PDU unit, or the ACK/NACK can be separately transmitted in response to packets of all reception subframes.

Fifth Method of Determining Timing at which ACK/NACK is Transmitted

Figures 15A, 15B:
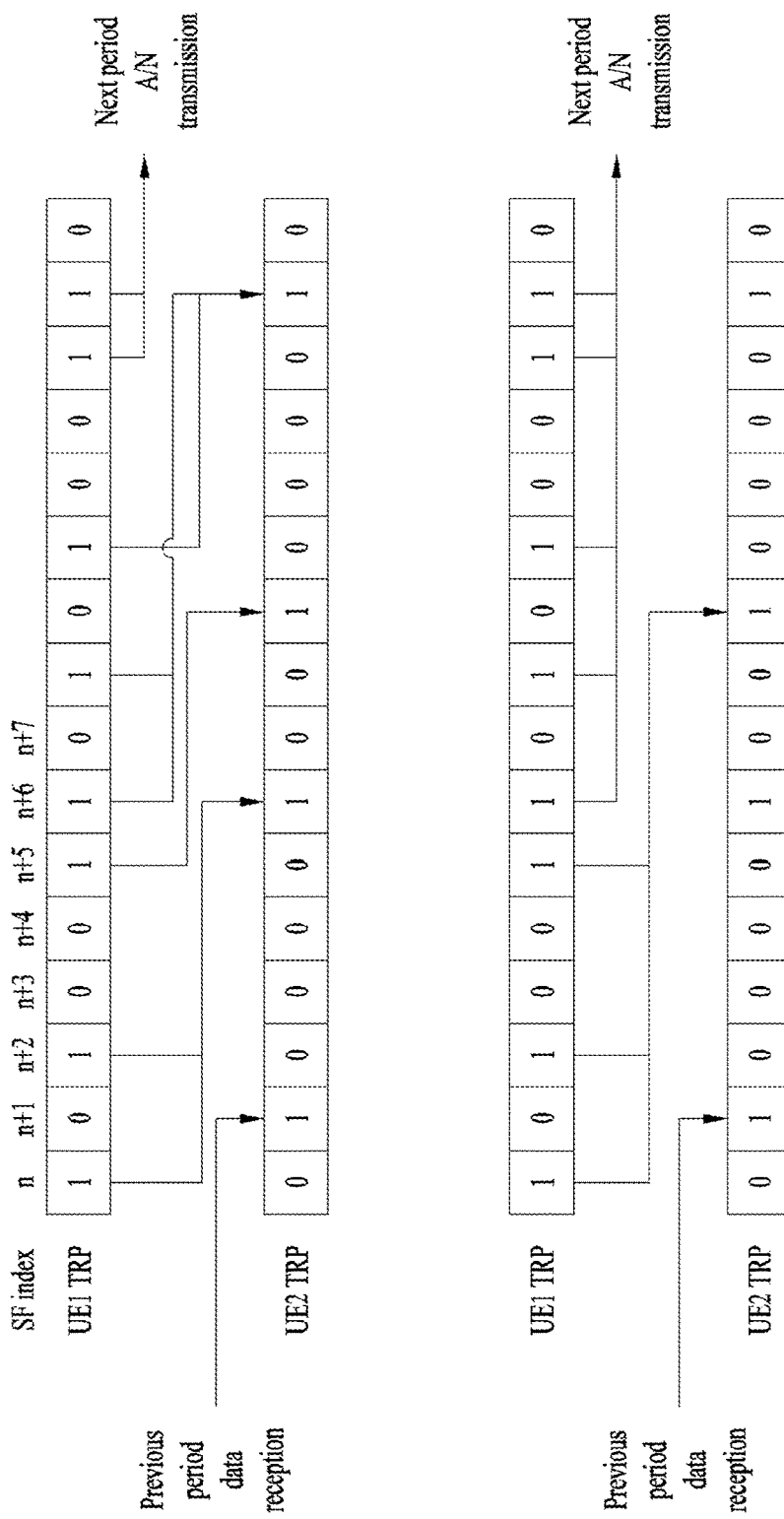

Meanwhile, ACK/NACK can be transmitted in every data Tx subframe (SCI piggyback). In this case, it may be able to configure a timing relationship by designating a data subframe related to the ACK/NACK. For example, as shown in FIG. 15A, when ACK/NACK is transmitted in a Tx subframe #n, the ACK/NACK is related to a subframe received in a subframe closest to a subframe #(n−4) (in particular, Tx subframe is naturally excluded). As mentioned earlier in the first method of determining ACK/NACK transmission timing in FIG. 15A, when a subframe in which transmission is performed by the first UE is determined by comparing T-RPT of the first UE with T-RPT of the second UE, FIG. 15B illustrates a case of applying ACK/NACK transmission in a subframe not overlapped with the subframe.

Meanwhile, a CSI measurement value can be transmitted together at the proposed ACK/NACK transmission timing. In particular, a subframe in which ACK/NACK is transmitted can include most recently received control information prior to the subframe or channel state information on data. For example, in FIGS. 15A and 15B, when ACK/NACK is transmitted in a subframe #n, if the ACK/NACK is transmitted in a subframe received prior to a subframe #(n−4) (including the subframe #(n−4)), it may be able to feedback CSI which is obtained by measuring a DMRS of a most recently received PSSCH/PSDCH in the subframe #(n−4).

Meanwhile, when a plurality of subframes are received, ACK/NACK can be individually transmitted in response to each of a plurality of the subframes. Or, ACK/NACK can be transmitted by applying A/N bundling (logical AND operation). Or, ACK/NACK can be transmitted in a manner of being bundled according to MAC PDU. When ACK/NACK are piggybacked, in order to indicate the number of ACK/NACK to be transmitted, information on the total number of ACK/NACK can be transmitted together.

Each of the embodiments can be applied to a case that SCI is transmitted in a data region in a manner of being piggybacked.

SCI (Sidelink Control Information) Contents and Transmission Resource

In the following, a method of transmitting SCI is proposed. According to the method, it is able to solve a problem of failing to receive feedback for data transmission, i.e., ACK/NACK, due to half-duplex constraint.

It may be able to transmit SCI (ACK/NACK, CSI, power control, RI, MIMO precoding information, and the like) via a separately allocated resource region. Specifically, a region identical to a PSCCH region or an additional PSCCH region (additional SCI resource pool or subframe of FIGS. 16A and 16B) is configured and SCI such as ACK/NACK, CSI, power control, and the like can be transmitted in the resource region. According to the method above, it may be able to have a merit in that it is able to reuse a resource region similar to a legacy SA resource pool. Since information such as ACK/NACK, CSI, and power control is not relevant to resource allocation of data, the information can be arranged after a data resource pool. If information such as ACK/NACK and CSI is transmitted together in a legacy SA resource, SCI information can be transmitted in a manner of being piggybacked by performing puncturing or rate matching on a partial RE in a PSCCH region.

Figure 16A:
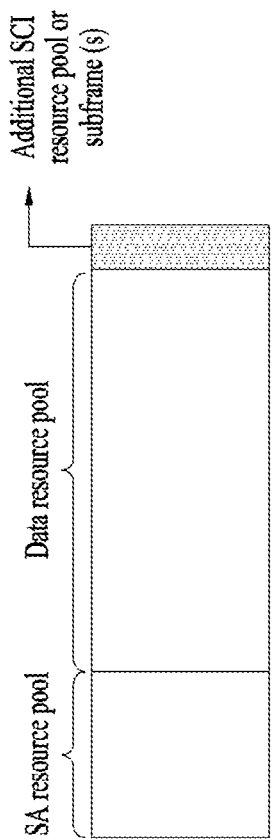
FIGS. 16A to 17B are diagrams illustrating an SCI transmission resource according to an embodiment of the present invention.
Figure 16B:
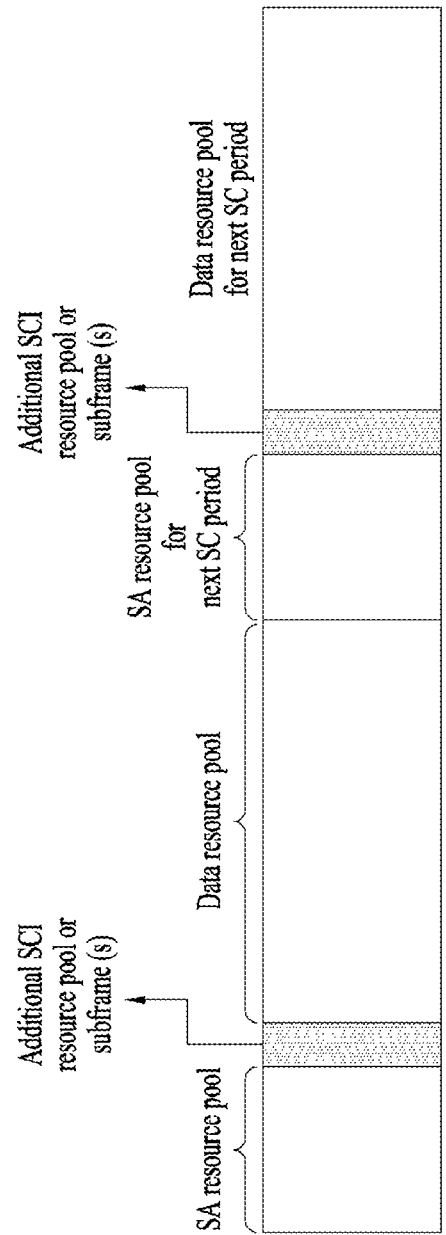

Or, ACK/NACK or CSI information can be transmitted in a manner of being included in a new field by defining an additional PSCCH format. Or, as shown in FIGS. 16A and 16B, it may be able to configure an additional resource pool for transmitting SCI after a legacy SA pool. The additional pool can be used for receiving ACK/NACK in response to data of a previous SC period. The additional SCI resource region can be configured for ACK/NACK, CSI, power control, and the like allocated in a previous data pool. In the resource region, it may be able to define a new format. In particular, although a length of a PSCCH format is identical to a length of a legacy PSCCH format, a contents field can be differently configured. Or, it may be able to define an additional physical layer format. For example, unlike the legacy PSCCH format, the additional physical layer format can be configured in a unit of 2 RBs or an RB size can be configured by a network. When SCI is transmitted in the additional SA resource region, ACK/NACK can be transmitted in response to received packets in a data region interlocked with the additional SA resource region. In this case, the ACK/NACK can be transmitted by bundling all of ACK/NACK for each received packet, the ACK/NACK can be transmitted by bundling the ACK/NACK in a MAC PDU unit, or the ACK/NACK can be transmitted in response to an individually received packet.

As a different method, it may be able to transmit SCI by piggybacking the SCI in data transmission within the same SA period. To this end, a transmission UE (first UE) can separately transmit SA for a data reception UE (second UE=ACK/NACK transmission UE, or data reception UE). Specifically, there are a method for the first UE to transmit SA of the second UE as well and a method for the first UE and the second UE to transmit SA, respectively.

Figure 17A:
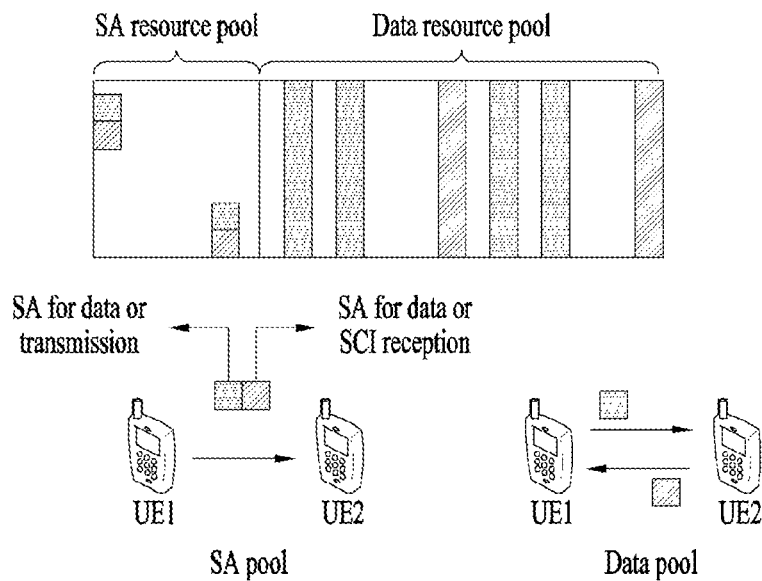

FIG. 17A illustrates a case that the first UE transmits both SA for transmitting data of the first UE and SA (indicating a resource for transmitting ACK/NACK of the second UE) for receiving ACK/NACK. The second UE can transmit ACK/NACK to the first UE using a resource indicated by the SA for receiving ACK/NACK. In this case, since the first UE transmits both of the SAs, the method has a merit in that it is not necessary to worry about a half-duplex constraint with the SA of the second UE. It is O.K. to transmit the SAs of the two UEs in the same subframe.

Figure 17B:
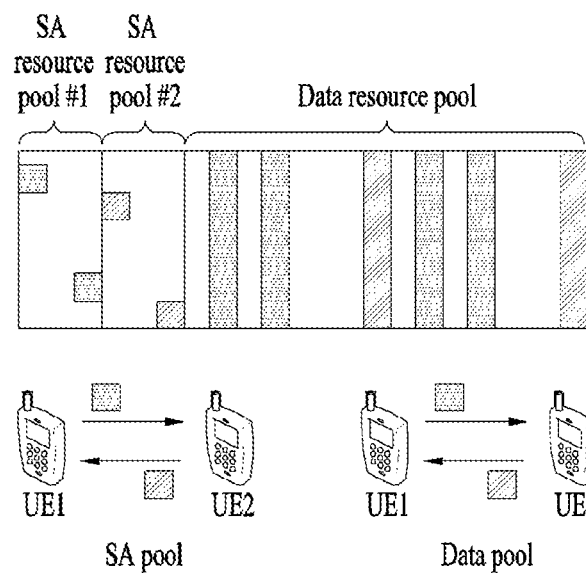

FIG. 17B illustrates a case that the second UE autonomously transmits SA. In this case, when the second UE receives SA transmitted by the first UE, in order for the second UE to determine a TRP based on the received SA, a plurality of SA pools can be configured. For example, an SA pool (SA resource pool #1) for transmitting data and an SA pool (SA resource pool #2) for transmitting SCI can be separately configured. According to the method, since the second UE monitors the SA of the first UE and is able to modify SA contents, degree of freedom of the second UE is increased compared to the method that the first UE transmits SA of the second UE. A network can indicate a UE and an SA pool to be used by the UE. Or, a UE can autonomously determine an SA pool to be used by the UE. A UE can inform a neighboring UE of an SA pool to be used in a next SC period via physical layer signaling or higher layer signaling.

In the foregoing description, the first UE may correspond to an R-UE (Relay UE) and the second UE may correspond to an M-UE (MTC (Machine Type Communication) UE or IoT device). In this case, the M-UE may correspond to a terminal mainly transmitting a low rate and requires help from a relay UE (R-UE). Or, the M-UE may correspond to a normal UE. In this case, the M-UE may correspond to a UE supporting D2D communication for communication with an R-UE. Or, the M-UE may correspond to a UE capable of communicating with a cellular base station with the help of an R-UE, although the M-UE is unable to directly communicate with the cellular base station. Or, the M-UE may correspond to a type of a wearable terminal. A user is wearing a smart watch, neck band, or the like and information can be transmitted to a cellular network via a cellular UE. The M-UE may have capability capable of directly accessing a cellular base station. However, in order to perform the operation above, since considerable amount of repetitions or Tx power is required, battery of the M-UE can be quickly consumed. If the M-UE discovers an R-UE, the M-UE switches a mode to use the R-UE as a relay and can access a cellular network. The R-UE receives a signal from an M-UE and relays the signal to an eNB. Or, the R-UE receives a signal from the eNB and may be able to relay the signal to the M-UE. In some cases, the R-UE may perform an operation of forwarding a signal of the M-UE or a different UE. The R-UE may perform an operation of controlling transmission or reception of the M-UE. Or, the R-UE may forward control information of the M-UE to an eNB or a UE corresponding to a relaying target or the R-UE may correspond to a UE indicating a transmission/reception resource region of the M-UE.

In the following, various embodiments of the present invention related to transmission power control of M-UE and R-UE are explained.

M-UE Transmission Power Control (M-UE-to-R-UE Tx Power Control)

It may be able to use all or a part of S-RSRP (synchronization signal RSRP) or D-RSRP (Discovery signal RSRP) of an R-UE or DMRS (average) received power of SA or data for OLPC (open loop power control) of an M-UE. In particular, It may apply OLPC to M-UEs using all or a part of S-RSRP of an R-UE, D-RSRP, and DMRS received power of SA or data. Specifically, it may be able to estimate PL (pathloss) using S-RSRP and/or D-RSRP and/or DMRS (average) received power of SA or data. According to the method above, since power control is performed on an R-UE, in the aspect of reception of the R-UE, the method has a merit in that it is able to mitigate in-band emission or a near far problem between M-UEs. In addition to the method above, it is able to utilize RSRQ from the R-UE. In this case, when OLPC towards the R-UE is applied, either an eNB or the R-UE can configure P0, alpha value.

As a first method, an eNB configures P0 and alpha of an M-UE and OPLC parameters (P0, alpha) can be signaled via physical layer signaling or higher layer signaling. In this case, since the eNB does not know a channel between the M-UE and an R-UE, the M-UE or the R-UE can report such a measurement result as coverage, signal strength, received signal power and the like between the M-UE and the R-UE to the eNB. The eNB can signal P0 and alpha using a measurement result on a mutual channel measured by the M-UE or the R-UE. As a second method, the R-UE can signal P0 and alpha values to be used by nearby M-UEs to the M-UE via physical layer signaling or higher layer signaling. The R-UE can identify a channel state using all or a part of D-RSRP or S-RSRP of the M-UE and DMRS (average) received power of SA or data. Hence, the R-UE configures appropriate P0 and alpha values to enable the M-UE to apply OLPC. In some cases, if the R-UE configures the alpha by 0, the M-UE can configure fixed power.

The maximum transmit power of the M-UE can be determined by equation 1 described in the following. According to the equation 1, when the M-UE determines max power, the max power can be restricted by OLPC of the eNB. And, it may be able to reduce in-band emission influence of a sidelink reception UE by applying OLPC between sidelink UEs while interference towards an eNB is maintained by a certain level or below in a state that a power control value towards the eNB is set to an upper limit value.

Equation 12

$$P_{M-UE} = \min \begin{Bmatrix} P_{CMAX,c}, 10\log_{10}(M_{sidelink}) + P_{O\_eNB} + \alpha_{eNB} \cdot PL_{eNB} + \Delta_{eNB}, \\ 10\log_{10}(M_{sidelink}) + P_{O\_sidelink} + \alpha_{sidelink} \cdot PL_{sidelink} + \Delta_{sidelink} \end{Bmatrix}$$

$P_{CMAX,c}$ denotes maximum transmit power usable on a specific carrier c, $M_{sidelink}$ denotes the number of RBs used for sidelink transmission, $P_{O\_eNB}$ denotes initial (power offset) power value configured by eNB, $\alpha_{eNB}$ denotes OLPC parameter alpha configured by eNB, $PL_{eNB}$ denotes a pathloss between eNB and UE, $\Delta_{eNB}$ denotes a power offset value determined according to CLPC and/or MCS, $P_{O\_sidelink}$ denotes P-o (initial power) value configured between sidelink UEs, $\alpha_{sidelink}$ denotes OLPC parameter between sidelink UEs, $PL_{sidelink}$ denotes a PL value between sidelink UEs, and $\Delta_{sidelink}$ denotes a power offset value determined according to CLPC between sidelink UEs and/or MCS. The $P_{CMAX,c}$ can be replaced with maximum power capable of being used as sidelink rather than maximum power on a carrier c.

R-UE Power Control (R-UE to M-UE, not Uu, DL Relaying)

All or a part of transmit power of the R-UE and a residual power value capable of being used for D2D (D2D power headroom) can be signaled to the M-UE via physical layer signaling or higher layer signaling. For example, transmit power or a residual power value (e.g., power headroom or reserved power for sidelink transmission) of the R-UE can be signaled to M-UEs via a discovery signal of the R-UE. When the R-UE transmits a signal to the M-UE, if the M-UE fails to properly receive the signal, the method above can make a case of failing to receive a signal due to a bad channel to be distinguished from a case of failing to receive a signal due to low transmit power. If the M-UE fails to receive a signal due to the low transmit power, the R-UE is able to increase transmit power via physical layer signaling or higher layer signal from the M-UE. The M-UE examines quality of a received signal and the transmit power of the R-UE. If it is necessary to more increase reception quality and the R-UE has remaining transmit power to be increased, the M-UE can ask the R-UE to increase the transmit power.

An OLPC (open loop power control parameter) (P0, alpha) used by the R-UE can be signaled by a network via physical layer signaling or higher layer signaling. In this case, the OLCP is applied to an eNB to mitigate interference to a cellular channel. In this case, closed loop power control can be controlled by the M-UE to make communication with the M-UE to be smoothly performed. In a broad sense, maximum transmit power of the R-UE can be controlled by the eNB and an upper limit of the maximum transmit power can be signaled by the eNB via physical layer signaling or higher layer signaling. In particular, the eNB can signal not only P0, alpha but also the maximum upper limit and/or the maximum lower limit at a corresponding location to the R-UE. The R-UE can determine transmit power upon the request of the M-UE or according to implementation of the R-UE within a range permitted by the eNB.

The M-UE can ask the R-UE to increase or decrease transmit power via physical layer signaling or higher layer signal. The R-UE feeds back information on the request of the M-UE (increase/decrease of transmit power, amount of the increase/decrease of transmit power, etc.) to a network and the network determines the final transmit power of the R-UE. According to the method above, it may be able to have a merit in that the network has all controllability and interference to the network can be more actively controlled.

M-UE Transmission/Reception Resource Indication

The R-UE can indicate a resource position in which data and/or a control signal of the M-UE is transmitted via physical layer signaling or higher layer signaling. In this case, although the R-UE can directly indicate the resource position to an individual UE, the R-UE can indicate a resource region transmitted by nearby M-UEs. Hence, the M-UEs can autonomously select and transmit a resource in the resource region. Similarly, in order to perform a DL relay operation, R-UES can signal a resource position in which transmission is performed by the R-UEs or resource region information to the M-UE via physical layer signaling or higher layer signaling.

As a different method, a transmission/reception resource of the M-UE can be signaled by a network via physical layer signaling or higher layer signaling. In some cases, the M-UE can be positioned at the outside of the coverage of the network. In this case, the M-UE can perform transmission/reception in a predetermined resource region.

Discovery Operation and Capability of M-UE and R-UE

When the M-UE operates according to power control indicated by an eNB while the M-UE does not know information on whether or not the R-UE exists, if the R-UE appears in the vicinity of the M-UE, the M-UE may operate by changing the power control with power control heading towards the R-UE. In order to perform the operation above, it is necessary for the M-UE and the R-UE to check the mutual existence. To this end, the M-UE and/or the R-UE are required to have capability capable of transmitting and/or receiving a D2D discovery signal. In order to reduce UE complexity, the M-UE may have either capability capable of transmitting a discovery signal or capability capable of receiving a discovery signal. If the M-UE has capability capable of receiving a discovery signal, the M-UE should perform an operation of receiving a discovery signal in a manner of waking up in every certain period. In this case, if there are many R-UEs, the M-UE should have complexity capable of decoding a plurality of discovery signals. Or, if the M-UE has capability capable of transmitting a discovery signal only, the M-UE transmits a discovery signal in a manner of waking up in every certain period. If the M-UE is able to handle sufficient complexity, the M-UE may have capability capable of transmitting and receiving a discovery signal.

In this case, in order to identify information on whether the R-UE has capability capable of transmitting a discovery signal only or capability capable of receiving a discovery signal only, it is necessary for the M-UE to transmit capability of the M-UE to the R-UE. For example, the M-UE can transmit the capability capable of transmitting/receiving a discovery signal to the R-UE using a partial field of a MAC header or a discovery message. On the other hand, the R-UE can also transmit capability capable of transmitting/receiving a discovery signal via a discovery message. If a counterpart UE has reception capability only (if no discovery message is received), the R-UE stops reception and may perform transmission only.

A power control operation of the M-UE can be changed according to a discovery result. Specifically, if the M-UE and/or the R-UE check the mutual existence (if a discovery signal of a counterpart UE is successfully decoded), a legacy power control parameter can be overridden using power control required by the R-UE. Or, the M-UE maintains power control towards the eNB for legacy uplink transmission only and can perform sidelink transmission using a power control parameter towards the R-UE. In particular, a power control parameter for sidelink and a power control parameter for uplink can be separately configured. If the M-UE establishes a connection with the R-UE or discovers the R-UE, the M-UE stops performing uplink transmission and may be then able to perform sidelink transmission (by applying power control for sidelink).

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 18:
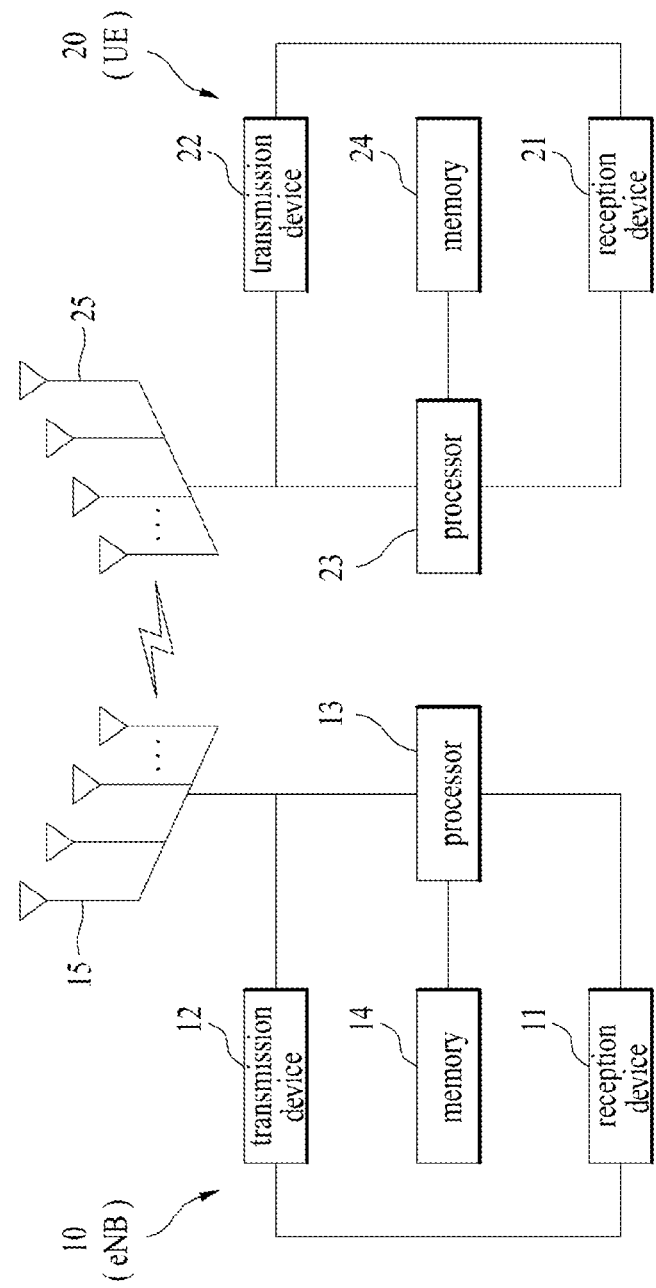
FIG. 18 is a diagram for configurations of a transmitter and a receiver.

FIG. 18 is a diagram for configurations of a transmitter and a receiver.

Referring to FIG. 18, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10. The processor 13 of the transmit point apparatus 10 according to one embodiment of the present invention may perform processes necessary for the embodiments described above. The processor receives data from a first UE via a receive module, determines a subframe in which ACK/NACK is to be transmitted by comparing T-RPT (Time Resource Pattern for Transmission) of the first UE with T-RPT of a second UE, and can transmit ACK/NACK to the first UE in the determined subframe in response to the received data. Explanation on other details operations is replaced with the aforementioned contents.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 18, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 18 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

The embodiments of the present invention can be applied to various mobile communication systems.

What is claimed is:

1. A method of performing a sidelink communication by a user equipment (UE) in a wireless communication system, the method comprising:
    calculating a first power value based on a first open loop power control parameter configured for a downlink and based on a downlink pathloss between a network and the UE and
    calculating a second power value based on a second open loop power control parameter configured for a sidelink and based on a sidelink pathloss between the UE and a counterpart UE of the sidelink communication;
    determining a transmission power for the sidelink communication based on a minimum value among the first power value and the second power value; and
    performing the sidelink communication to the counterpart UE based on the transmission power.

2. The method according to claim 1, wherein the first open loop power control parameter comprises a first power offset configured by the network, and the second open loop power control parameter comprises a second power offset configured by the network.

3. The method according to claim 1, wherein the first open loop power control parameter comprises a first alpha value to be multiplied with the downlink pathloss, and the second open loop power control parameter comprises a second alpha value to be multiplied with the sidelink pathloss.

4. The method according to claim 1, wherein both the first power value and the second power value are calculated further based on a number of resource blocks used for the sidelink communication.

5. A user equipment (UE) in a wireless communication system, the UE comprising:

at least one transceiver;

at least one processor; and at least one computer memory operably connectable to the at least one processor and storing instructions that, when executed, cause the at least one processor to perform operations comprising:

calculating a first power value based on a first open loop power control parameter configured for a downlink and based on a downlink pathloss between a network and the UE calculating a second power value based on a second open loop power control parameter configured for a sidelink and based on a sidelink pathloss between the UE and a counterpart UE of a sidelink communication;

determining a transmission power for the sidelink communication based on a minimum value among the first power value and the second power value; and performing the sidelink communication to the counterpart UE based on the transmission power.

6. The UE according to claim 5, wherein the first open loop power control parameter comprises a first power offset configured by the network, and the second open loop power control parameter comprises a second power offset configured by the network.

7. The UE according to claim 5, wherein the first open loop power control parameter comprises a first alpha value to be multiplied with the downlink pathloss, and the second open loop power control parameter comprises a second alpha value to be multiplied with the sidelink pathloss.

8. The UE according to claim 5, wherein both the first power value and the second power value are calculated further based on a number of resource blocks used for the sidelink communication.

9. An apparatus for a user equipment (UE), the apparatus comprising:

at least one processor; and at least one computer memory operably connectable to the at least one processor and storing instructions that, when executed, cause the at least one processor to perform operations comprising:

calculating a first power value based on a first open loop power control parameter configured for a downlink and based on a downlink pathloss between a network and the UE;

calculating a second power value based on a second open loop power control parameter configured for a sidelink and based on a sidelink pathloss between the UE and a counterpart UE of a sidelink communication;

determining a transmission power for the sidelink communication based on a minimum value among the first power value and the second power value; and performing the sidelink communication to the counterpart UE based on the transmission power.

10. The apparatus according to claim 9, wherein both the first power value and the second power value are calculated further based on a number of resource blocks used for the sidelink communication.

11. A non-transitory computer readable storage medium storing at least one computer program comprising instructions that, when executed by at least one processor, cause the at least one processor to perform operations for a user equipment (UE), the operations comprising:

calculating i) a first power value based on a first open loop power control parameter configured for a downlink and based on a downlink pathloss between a network and the UE;

calculating a second power value based on a second open loop power control parameter configured for a sidelink and based on a sidelink pathloss between the UE and a counterpart UE of a sidelink communication;

determining a transmission power for the sidelink communication based on a minimum value among the first power value and the second power value; and performing the sidelink communication to the counterpart UE based on the transmission power.

12. The non-transitory computer readable storage medium according to claim 11, wherein both the first power value and the second power value are calculated further based on a number of resource blocks used for the sidelink communication.

\* \* \* \* \*